(12) United States Patent
Subburaj et al.

(10) Patent No.: US 12,248,091 B2
(45) Date of Patent: Mar. 11, 2025

(54) RADAR SYSTEM IMPLEMENTING SEGMENTED CHIRPS AND PHASE COMPENSATION FOR OBJECT MOVEMENT

(71) Applicant: TEXAS INSTRUMENTS INCORPORATED, Dallas, TX (US)

(72) Inventors: Karthik Subburaj, Bangalore (IN); Sandeep Rao, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 433 days.

(21) Appl. No.: 17/486,435

(22) Filed: Sep. 27, 2021

(65) Prior Publication Data

US 2023/0094118 A1 Mar. 30, 2023

(51) Int. Cl.
*G01S 7/35* (2006.01)
*G01S 13/58* (2006.01)
*G01S 13/931* (2020.01)

(52) U.S. Cl.
CPC ............ *G01S 7/356* (2021.05); *G01S 13/584* (2013.01); *G01S 13/931* (2013.01)

(58) Field of Classification Search
CPC ....... G01S 7/356; G01S 13/584; G01S 13/931
See application file for complete search history.

(56) References Cited

U.S. PATENT DOCUMENTS

| 2007/0152871 A1 | 7/2007 | Puglia |
| 2016/0061942 A1 | 3/2016 | Rao et al. |
| 2016/0131752 A1* | 5/2016 | Jansen ..................... G01S 13/42 342/27 |

(Continued)

FOREIGN PATENT DOCUMENTS

| DE | 102018123383 A1 * | 4/2019 | ........... G01S 13/343 |
| DE | 102018010369 A1 * | 5/2020 | ........... G01S 13/341 |

(Continued)

OTHER PUBLICATIONS

PCT Search Report—PCT/US2022/044843, International filing date Sep. 27, 2022.

*Primary Examiner* — Vladimir Magloire
*Assistant Examiner* — Maxine McKenzie Phillips
(74) *Attorney, Agent, or Firm* — Michael T. Gabrik; Frank D. Cimino

(57) ABSTRACT

An apparatus comprises processor cores and computer-readable mediums storing machine instructions for the processor cores. When executing the machine instructions, the processor cores obtain received signals for transmitted chirps from a radar sensor circuit. Each transmitted chirp comprises an A chirp segment, a time gap, and a B chirp segment, respectively. The processor cores sample the received signals to obtain sampled data matrices M1(A) for the A chirp segments and M1(B) for the B chirp segments. The processor cores perform a first Fourier transform (FT) on each column of M1(A) and M1(B) to obtain velocity matrices M2(A) and M2(B), respectively. The processor cores apply a phase compensation factor to M2(B) to obtain a phase corrected velocity matrix M2(B'), and concatenate M2(A) and M2(B') to obtain an aggregate velocity matrix M2(A&B'). The processor cores perform a second FT on each row of M2(A&B') to obtain a range and velocity matrix M3(A&B').

23 Claims, 4 Drawing Sheets

(56) References Cited

U.S. PATENT DOCUMENTS

| | | | |
|---|---|---|---|
| 2017/0016979 A1 | 1/2017 | Cho | |
| 2017/0219689 A1* | 8/2017 | Hung | G01S 7/0232 |
| 2019/0242972 A1 | 8/2019 | Melzer et al. | |
| 2020/0049812 A1* | 2/2020 | Jansen | G01S 13/4454 |
| 2020/0284901 A1* | 9/2020 | Tierney | G01S 13/4463 |

FOREIGN PATENT DOCUMENTS

| | | | | |
|---|---|---|---|---|
| EP | 3173812 A1 * | 5/2017 | | G01S 13/343 |
| EP | 3324205 A1 * | 5/2018 | | G01S 13/343 |
| EP | 3021132 B1 * | 3/2020 | | G01S 13/343 |
| EP | 3819662 A1 * | 5/2021 | | G01S 13/343 |
| KR | 1020200026599 | | 3/2020 | |
| WO | WO-2016033361 A1 * | 3/2016 | | G01S 13/343 |
| WO | WO-2019070751 A1 * | 4/2019 | | G01S 17/06 |
| WO | WO-2021108621 A1 * | 6/2021 | | G01S 13/42 |

* cited by examiner

RADAR SYSTEM IMPLEMENTING SEGMENTED CHIRPS AND PHASE COMPENSATION FOR OBJECT MOVEMENT

BACKGROUND

Many driving assistance systems implement frequency modulated continuous wave (FMCW) radar systems to aid in collision warning, blind spot warning, lane change assistance, parking assistance, and rear collision warning. The basic transmit signal of FMCW radar is a frequency ramp, also commonly known as a "chirp." A chirp is a signal whose frequency varies linearly with time. For example, a millimeter wave radar system might transmit a chirp with a 4 GigaHerz (GHz) bandwidth that starts at 77 GHz and linearly increases to 81 GHz. The transmitted chirp reflects off one or more objects, and the reflected signal is received at one or more receiver antennas. An FMCW radar system transmits a series of these equally spaced chirps in a unit called a frame. The reflected signal is down-converted, digitized and then processed to obtain the range, velocity, and angle of arrival for objects in front of the radar system.

The distance or range resolution of an FMCW radar system defines how well or poorly the radar system resolves closely spaced objects. The minimum resolvable distance is inversely proportional to chirp bandwidth. However, it may be difficult to produce a wide-bandwidth chirp that meets noise specifications. Some radar systems implement segmented chirp signals, in which a single chirp signal includes two or more chirp segments. However, moving objects in the environment can introduce a phase error between a received signal for a first chirp segment and a received signal for a second chirp segment, due to a time gap between generating the first chirp segment and generating the second chirp segment.

SUMMARY

An example apparatus includes one or more processor cores and one or more non-transitory computer-readable mediums storing machine instructions for the one or more processor cores. When executing the machine instructions, the one or more processor cores obtain received signals corresponding to a number Nc of transmitted chirps from a radar sensor circuit. Each of the Nc transmitted chirps comprises an A chirp segment, a time gap Tgap, and a B chirp segment, respectively. The one or more processor cores sample the received signals to obtain a first sampled data matrix M1(A) corresponding to the A chirp segments and a second sampled data matrix M1(B) corresponding to the B chirp segments.

The processor cores perform a first Fourier transform (FT) on each column of M1(A) to obtain a first velocity matrix M2(A) and on each column of M1(B) to obtain a second velocity matrix M2(B). The processor cores then apply a phase compensation factor ϕcorrection to M2(B) to obtain a phase corrected second velocity matrix M2(B'), and concatenate M2(A) and M2(B') to obtain an aggregate velocity matrix M2(A&B'). The processor cores perform a second FT on each row of M2(A&B') to obtain a range and velocity matrix M3(A&B').

In some examples, the one or more processor cores apply ϕcorrection to M2(B) by determining a ϕcorrection(m) for each row m of M2(B) and multiplying each element in row m of M2(B) by ϕcorrection(m). In some examples, where each of the Nc transmitted chirps has a period Tchirp, the A chirp segment is transmitted before Tgap, and the B chirp segment is transmitted after Tgap, the one or more processor cores determine ϕcorrection(m) using the equation:

$$\phi\text{correction}(m) = e^{-j2\pi m'K}$$

where m' is proportional to a velocity represented by row m of M2(B) and represented as:

$$m' = \begin{cases} m; & \text{if } 0 \leq m \leq \frac{Nc}{2} \\ m - Nc; & \text{if } \frac{Nc}{2} < m < Nc \end{cases}$$

and where K is proportional to Tgap and represented as:

$$K = \frac{Tgap}{Nc(Tchirp)}.$$

In some examples, where each of the Nc transmitted chirps has a period Tchirp, the B chirp segment is transmitted before Tgap, and the A chirp segment is transmitted after Tgap, the one or more processor cores determine ϕcorrection(m) using the equation:

$$\phi\text{correction}(m) = e^{-j2\pi m'K}$$

where m' is proportional to a velocity represented by row m of M2(B) and represented as:

$$m' = \begin{cases} m; & \text{if } 0 \leq m \leq \frac{Nc}{2} \\ m - Nc; & \text{if } \frac{Nc}{2} < m < Nc \end{cases}$$

and where K is proportional to Tgap and represented as:

$$K = \frac{Tgap}{Nc(Tchirp)}.$$

The one or more processor cores apply a window function to M1(A) and M1(B) in some examples, and perform the first FT on each column of windowed M1(A) and windowed M1(B). The processor cores can also apply a window function to M2(A&B') and perform the second FT on each row of windowed M2(A&B'). The window functions can be Hanning window functions.

The apparatus can further comprise the radar sensor circuit, and the one or more processors can cause the radar sensor circuit to transmit the Nc transmitted chirps and generate the received signals corresponding to the Nc transmitted chirps. The radar sensor circuit can comprise an oscillator system, a transmitter antenna unit coupled to the oscillator, a receiver antenna unit, a baseband module coupled to the receiver antenna unit, and an analog to digital converter coupled to the baseband module. The oscillator system generates, and the transmitter antenna unit transmits, the Nc transmitted chirps.

The receiver antenna unit receives reflections of the Nc transmitted chirps, and the baseband module generates the received signals based on the received reflections of the Nc transmitted chirps. The analog to digital converter samples the received signals to obtain M1(A) and M1(B). In some examples, the oscillator system comprises a first voltage controlled oscillator to generate the A chirp segments and a second voltage controlled oscillator to generate the B chirp segments. The time gap Tgap in each transmitted chirp corresponds to a time delay between generation of the A chirp segment and generation of the B chirp segment.

BRIEF DESCRIPTION OF THE DRAWINGS

For a detailed description of various examples, reference will now be made to the accompanying drawings in which.

DETAILED DESCRIPTION

Radar systems that implement segmented chirp signals to increase chirp bandwidth without sacrificing phase noise specifications often experience phase errors in environments with moving objects, due to a time gap between generating a first chirp segment and generating a second chirp segment. Some radar systems ignore the phase error and suffer performance decreases as a result. Some radar systems process the two received signals separately, with zero padding to increase the length of the received signals to the full chirp length. Zero padding and processing the two received signals separately doubles the number of computations and amount of memory space required to process the received signals and determine the range, velocity, and angle of arrival for objects near the radar system. The disclosed radar systems compensate for the phase difference due to the time gap without drastic increases in the number of computations or memory space required to process received signals by first performing a column-wise Doppler Fourier transform (FT) and applying a phase compensation factor to the data based on the speeds of objects in the environment.

An example radar system obtains received signals corresponding to a first transmitted chirp segment and a second transmitted chirp segment. The transmitted chirp signal as a whole includes the first chirp segment, a time gap, and the second chirp segment. The radar system obtains received signals for a number of transmitted chirp signals, and samples the received signals to obtain two sampled data matrices: M1(A) corresponding to the first chirp segments and M1(B) corresponding to the second chirp segments. The radar system performs a column-wise Doppler FT on each column of M1(A) and M1(B) to obtain two velocity data matrices: M2(A) and M2(B), respectively.

Then, the radar system applies a phase compensation factor to M2(B) to obtain a corrected velocity data matrix M2(B'), and concatenates M2(A) and M2(B') to obtain an aggregate velocity data matrix M2(A&B'). The radar system performs a range FT on each row of M2(A&B') to obtain a range and velocity data matrix M3(A&B'). This process may be repeated for each receiver antenna included in the radar system. The resultant range and velocity data matrices for multiple receiver antennae can be used to obtain the range, velocity, and angle of arrival of objects in the environment around the radar system without requiring modification to those calculations or sacrificing accuracy.

Figure 1:
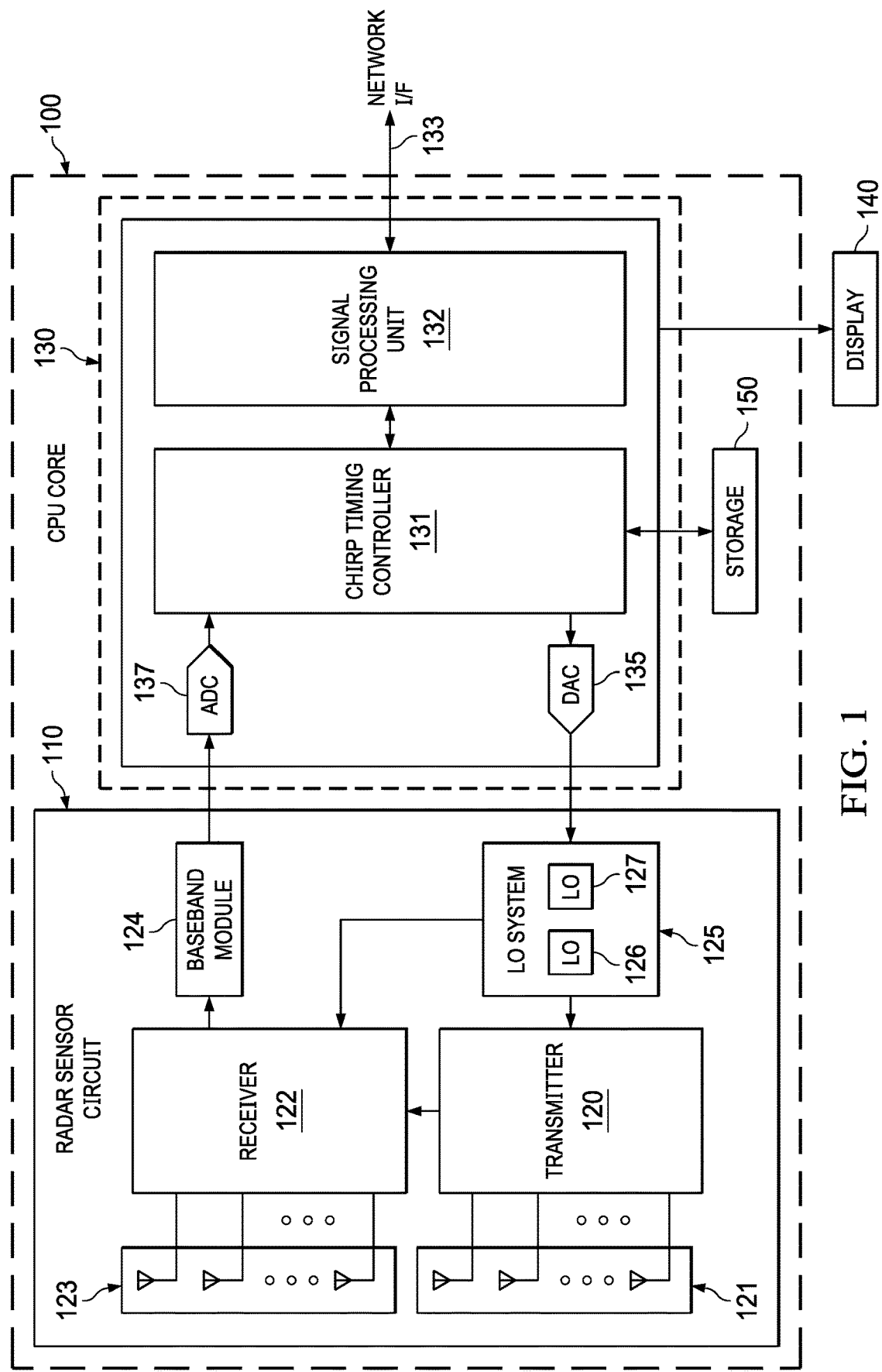
FIG. 1 illustrates an example radar system.

FIG. 1 is a block diagram of an example radar system 100. Radar system 100 may be used in a vehicle or other suitable application. In this example, radar system 100 includes a radar sensor circuit 110, a central processing unit (CPU) core 130, a display 140, and storage 150. Radar sensor circuit 110 includes a transmitter 120 that drives an antenna array 121 of one or more transmitter antennas. A receiver 122 receives signals from an antenna array 123 of one or more receiver antennas. A baseband module 124 amplifies and filters the received signals that are reflected from objects in the path of the transmitted chirp signals. In this example radar system, transmitter 120 operates in the 77 GHz region and produces a frequency modulated continuous wave (FMCW) signal. The continuous wave signal is frequency modulated to form a series of chirps using a local oscillator (LO) system 125, which includes a first LO 126 and a second LO 127. In example radar system 100, the transmitter antenna array 121 and receiver antenna array 123 are stationary with respect to radar system 100. In other examples, the antenna arrays may be configured to transmit and receive across a range of area, such as by mechanical movement.

FMCW radar, also referred to as continuous-wave frequency-modulated (CWFM) radar, is capable of determining distance, velocity, and angle of arrival. In a FMCW system, the transmitted chirp signal comprises continuous wave whose frequency is modulated linearly over a fixed period of time. Received reflections are then mixed with the transmitted chirp signal to produce a received beat signal. Frequency differences between the received reflections and the transmitted chirp signal increase with delay and are therefore proportional to distance. Multiple chirps are transmitted in a unit called a frame. The phase differences between the received reflections across consecutive chirps allow the velocity of target objects to be computed. The phase differences between the received reflections at a first receiver antenna and the received reflections at a second receiver antenna allow the angle of arrival of target objects to be computed. Thus with an FMCW radar system, the distance between the target object and the radar system, relative velocity of the target object, relative angle of the target object and the like can be calculated.

During normal operation, linear frequency chirps are transmitted, and reflected signals are received. The receiver and transmitter are arranged as a homodyne system so that the received reflections are down-converted directly into the baseband in receiver 122 using a copy of the transmitted signal from LO system 125. The baseband signals are then filtered and amplified by filters and variable gain amplifiers by baseband module 124. After converting the baseband signals into the digital domain, time domain to frequency domain transforms such as fast FTs (FFTs) may be applied and other signal processing performed in order to determine the distance, velocity, and angle of arrival between the target object and radar system 100.

CPU core 130 comprises one or more CPU cores, digital signal processors, application specific integrated circuits, and the like, as described previously. The term "processing unit (PU) core" or "CPU core" (singular) is used herein to refer to either a single or multiple PU or CPU cores, and to broadly describe central processing units, digital signal processors, application specific integrated circuits, and the like. CPU core 130 includes a chirp timing controller module 131 that receives a stream of data from receiver antenna array 123 via an analog to digital converter (ADC)

137 and performs chirp generation and control of the transmitter via a digital to analog converter (DAC) 135. A varying voltage tuning control signal from DAC 135 is used to control LO system 125. Storage 150 may be used to store instructions and data received from antenna 123. Storage 150 may be any appropriate non-transitory storage medium, such as a static random access memory (SRAM). CPU core 130 also includes a signal PU 132 that performs signal processing for determining a velocity, an angle of arrival, distance between the target object and radar system 100, and the like. Signal PU 132 can provide the determined values to display 140 and/or communicate with other systems via a network interface 133. Network 133 may include various combinations of local area networks (LANs), wide area networks (WANs), the internet and/or other known or later developed wired or wireless communication mechanisms, for example.

In some radar systems, LO system 125 generates a plurality of chirp segments. The plurality of chirp segments includes a first chirp segment and a second chirp segment, for example as shown in FIG. 2B. In some implementations, LO system 125 includes a phase locked loop (PLL) and/or a plurality of LOs, such as LO 126 and LO 127, to generate the plurality of chirp segments. A time difference between generating the first chirp segment and generating the second chirp segment includes a time taken for LO system 125 to switch from a first LO 126 to a second LO 127. The first LO 126 and the second LO 127 can use the same or different voltage controlled oscillators, and the same or different PLL circuitry. Transmitter 120 and transmitter antenna array 121 transmit the first and second chirp segments, which are reflected by objects in the environment. ADC 137 samples the received beat signals for the first and second chirp signals and provides the sampled data vectors to CPU core 130 and signal PU 132.

Figure 2A:
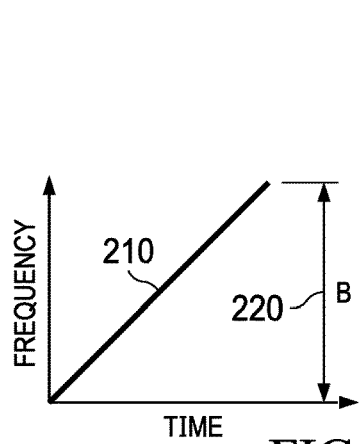
FIGS. 2A-B show example contiguous and segmented chirp signals generated by an oscillator system in the example radar system shown in FIG. 1.
Figure 2B:
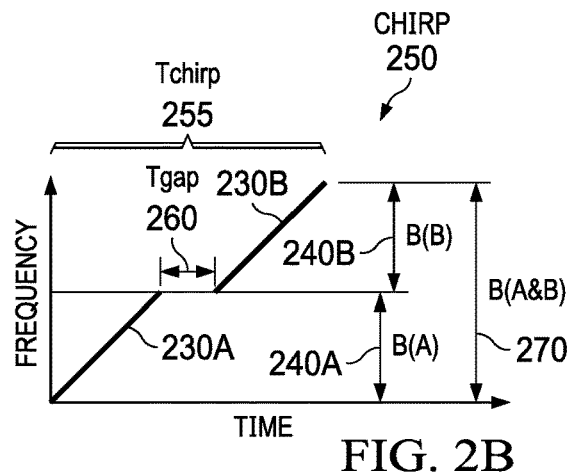

FIGS. 2A-B illustrate two example frequency modulated chirp signals for use in FMCW radar. FIG. 2A shows the changing frequency of a chirp signal 210 in a graph of frequency of the chirp signal over time. The chirp signal 210 has a given bandwidth 220 as illustrated. Range resolution defines the capability of an example FMCW radar system to resolve closely spaced objects and is directly proportional to the bandwidth of the transmitted chirp signal. The minimum resolvable distance is inversely proportional to chirp bandwidth. A chirp generator such as local oscillator system 125 in example radar system 100 shown in FIG. 1 must also generate chirp signals meeting phase noise specifications for desired performance levels. Some radar systems balance the desired phase noise specifications with the bandwidth B 220 of chirp signal 210.

Other radar systems instead use multiple chirp generators to generate a single chirp signal 250 comprising a plurality of chirp segments, as shown in FIG. 2B. Chirp segment 230A with a bandwidth B(A) 240A is generated by a first chirp generator, such as LO 126 in LO system 125 shown in FIG. 1, and chirp segment 230B with a bandwidth B(B) 240B is generated by a second chirp generator, such as LO 127 in LO system 125 shown in FIG. 1. The resulting chirp signal 250 has a bandwidth B(A&B) 270 comprising bandwidth B(A) 240A for chirp segment 230A and bandwidth B(B) 240B for chirp segment 230B. The time Tgap 260 represents the time needed for the radar system transmitting chirp signal 250 to switch from the first chirp generator to the second chirp generator. Tgap 260 may include the time for a local oscillator to switch from one voltage controlled oscillator to another, to switch from one tuning element to another, and/or to settle after switching.

If the environment around the radar system includes a moving object, Tgap 260 may result in an undesired phase difference $\Delta\phi$ between the first received signal for chirp segment 230A and the second received signal for chirp segment 230B due to the Doppler effect. The phase difference $\Delta\phi$ between the first and second received signals may be represented as:

$$\Delta\phi = \frac{4\pi(fc)(v)(Tgap)}{c}$$

where (fc) represents the center frequency of the transmitted chirp signal 250, c is the speed of light, and v represents the velocity of the object. The phase difference $\Delta\phi$ causes leakage of peak received signals, corresponding to larger and closer objects, which can suppress received signals corresponding to smaller or more distant objects and decrease the sensitivity of the radar system.

Figure 3:
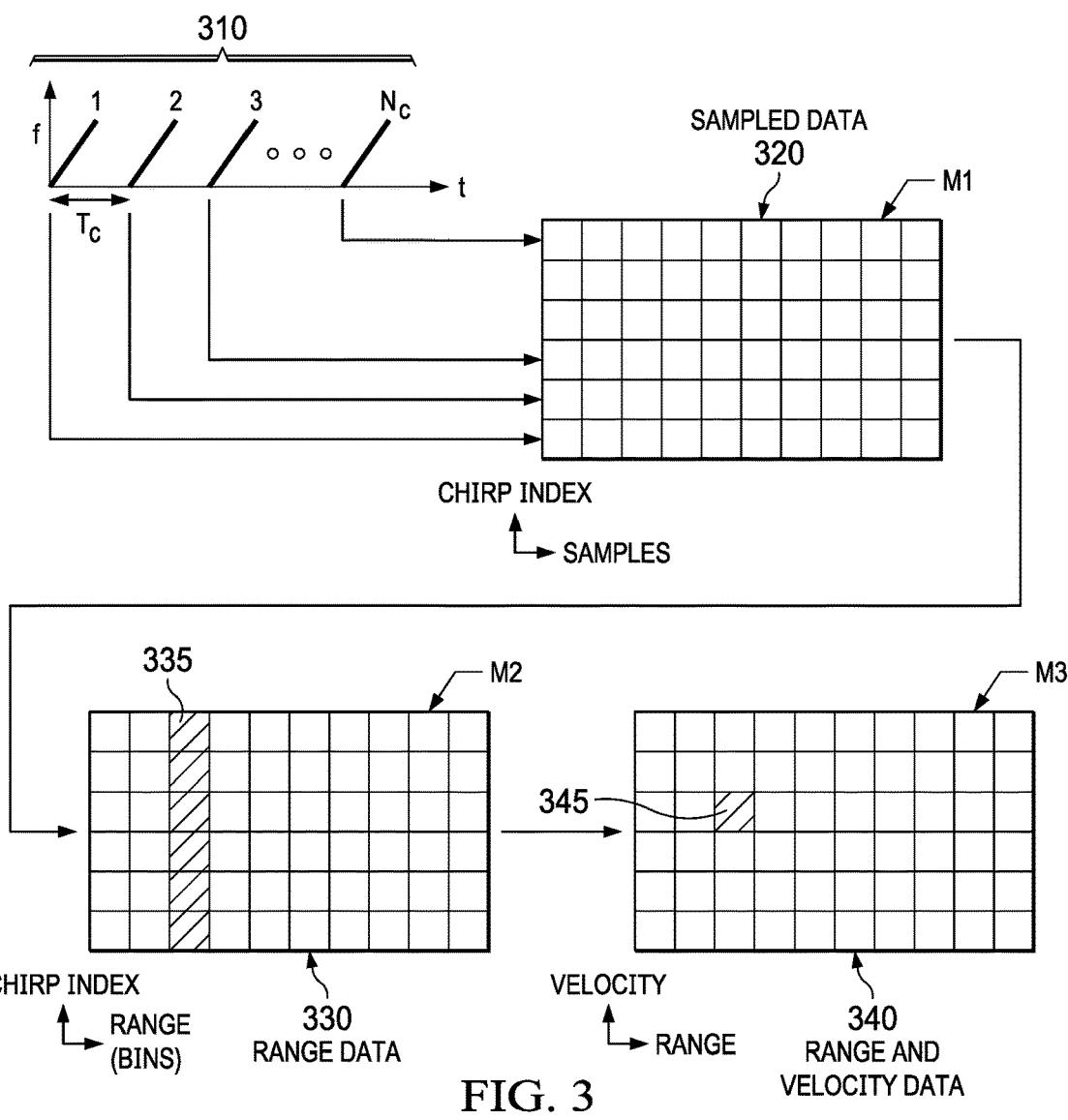
FIG. 3 illustrates an example data processing flow for data received from a radar system using contiguous chirp signals.

FIG. 3 illustrates an example data processing flow for data received from a radar system using contiguous chirp signals, such as chirp signal 210 shown in FIG. 2A. Section 310 represents the transmitted chirp signals 1-Nc, where Nc is the number of chirps in a frame. An ADC such as ADC 137 samples the received signals corresponding to each of the transmitted chirps shown in 310 for a particular receiver antenna to generate a sampled data vector, resulting in Nc sampled data vectors aggregated into sampled data 320 shown in matrix M1. Each row in matrix M1 corresponds to a particular received signal and sampled data vector. In this example and for ease of illustration, Nc is six and the ADC samples each received signal ten times over the course of the received signal's period Tc, resulting in a six by ten matrix M1. The number of chirps Nc and the number of times the ADC samples each received signal may be chosen based on the particular implementation and result in a matrix M1 of any appropriate size.

A signal processing unit such as signal PU 132 performs a range FFT on each ADC data vector included in matrix M1, resulting in range data 330 shown in matrix M2. Each row in matrix M2 corresponds to a range FFT of the corresponding sampled data vector in matrix M1. Each column corresponds to a range bin representing a range of distances between the object and the radar system. The value at a given column and row in matrix M2 represents a likelihood of an object being present at that particular range bin. Shaded column 335 represents a range bin having values of a magnitude greater than a threshold magnitude, indicating an object lies within that range of distances. Then the signal processing unit performs another FFT for each range bin across chirps, i.e., along each column of matrix M2. This FFT is often called a Doppler-FFT, and resolves objects in each range bin based on their relative velocity with respect to the radar system, resulting in range and velocity data 340 shown in matrix M3. Shaded cell 345 represents an object with a range proportional to the column number of shaded cell 345 and a velocity proportional to the row number of shaded cell 345, the object indicated in shaded column 335 in matrix M2. Matrix M3 is used in combination with other matrices M3 corresponding to other receiver antennas in the radar system for additional signal processing, such as angle of arrival estimation, appropriate scaling to determine range and velocity of the object, and the like.

However, the example data processing flow shown in FIG. 3 for contiguous chirp signals may not be suitable as-is for segmented chirp signals, as it does not account for the phase difference Δφ due to Tgap between chirp segments. Some signal processing units zero pad the sampled data vectors for received signals for each chirp segment and then perform range FFTs separately on each zero-padded chirp segment. For example, with respect to chirp signal 250 and chirp segments 230A and 230B shown in FIG. 2B, a signal processing unit zero pads the sampled data vector for the received signals for chirp segments 230A and 230B such that each sampled data vector is as long as a sampled data vector for the entire chirp signal 250. Thus, each chirp signal 250 corresponds to two full length sampled data vectors-one for the zero padded chirp segment 230A and one for the zero padded chirp segment 230B. The two full length sampled data vectors are combined only after range FFTs are performed, doubling the number of computations and memory space needed to perform the example data processing flow shown in FIG. 3.

Figure 4:
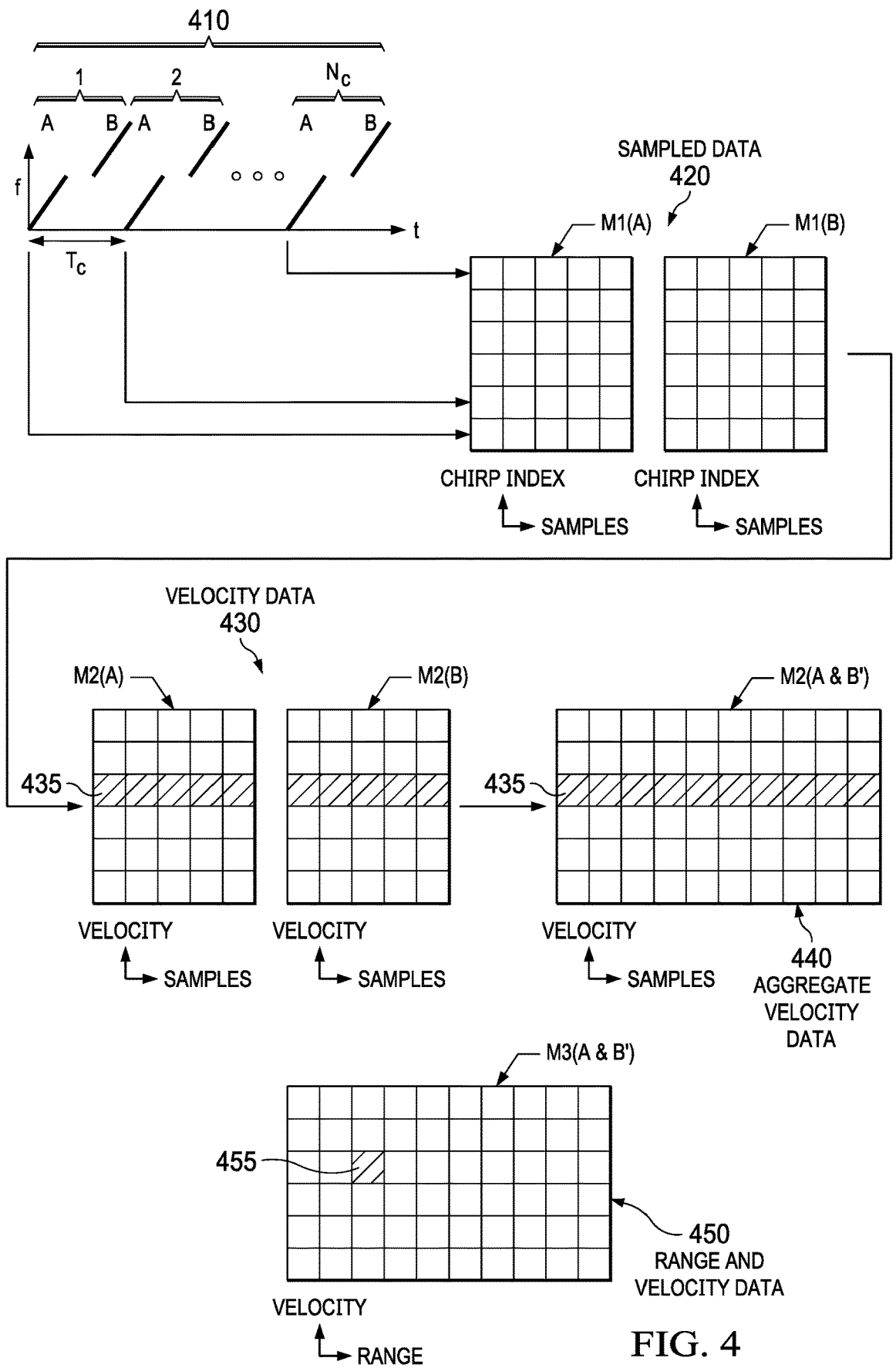
FIG. 4 illustrates an example data processing flow for data received from a radar system using segmented chirp signals.

FIG. 4 illustrates an example data processing flow for data received from a radar system using segmented chirp signals such as chirp segments 230A and 230B shown in FIG. 2B, avoiding the additional computations and memory space discussed previously herein with reference to FIG. 3. Section 410 represents the transmitted chirp signals 1-Nc, where Nc is the number of chirps in a frame. Each transmitted chirp signal comprises an A chirp segment and a B chirp segment. An ADC such as ADC 137 shown in FIG. 1 samples the received signals corresponding to both segments of each of the Nc transmitted chirps shown in 410 to generate a sampled data vector, resulting in Nc sampled data vectors corresponding to the A chirp segments and Nc sampled data vectors corresponding to the B chirp segments. The Nc sampled data vectors corresponding to the A chirp segments are aggregated into a matrix M1(A), and the Nc sampled data vectors corresponding to the B chirp segments are aggregated into a matrix M1(B). Sampled data 420 comprises both M1(A) and M1(B).

A signal processing unit such as signal PU 132 shown in FIG. 1 performs a Doppler-FFT along each column in M1(A) and M1(B), resulting in velocity data 430 including a matrix M2(A) for the A chirp segments and a matrix M2(B) for the B chirp segments. Velocity data 430 resolves the sampled chirp values by relative velocity with respect to the radar system, such that each row in M2(A) and M2(B) corresponds to a particular relative velocity. Because the Doppler-FFT is performed column-wise, the phase difference Δφ due to Tgap between the A and B chirp segments does not cause errors in velocity data 430. Shaded row 435 in M2(A) and M2(B) represents a particular velocity bin having values of a magnitude greater than a threshold magnitude, indicating an object in the environment moves at that particular velocity.

Then, the signal processing unit compensates for the phase difference Δφ by multiplying the elements in each row of M2(B) by a phase correction factor φcorrection proportional to Tgap and the velocity represented by the particular row, resulting in a corrected matrix M2(B'). The phase correction factor φcorrection for a particular row m of M2(B) may be represented as:

$$\phi\text{correction}(m)=e^{-j2\pi m'K}$$

where m' is proportional to the velocity represented by row m of M2(B) and K is a constant proportional to Tgap. The signal processing unit derives m' from m as follows:

$$m' = \begin{cases} m; & \text{if } 0 \le m \le \frac{Nc}{2} \\ m - Nc; & \text{if } \frac{Nc}{2} < m < Nc \end{cases}$$

The constant K may be represented as:

$$K = \frac{Tgap}{Nc(Tchirp)}$$

where Tchirp represents the period of the chirp signal, as shown in FIG. 2B. The resulting matrix M2(B') can be concatenated with M2(A) to obtain aggregate velocity data 440 represented by matrix M2(A&B'). Although this example multiplies M2(B) by the phase correction factor φcorrection, the signal processing unit can also compensate for the phase difference Δφ using M2(A) instead. In that process, elements in each row of M2(A) are multiplied by the phase correction factor φcorrection represented as:

$$\phi\text{correction}(m)=e^{-j2\pi m'K}$$

The resulting matrix M2(A') can be concatenated with M2(B) to obtain aggregate velocity data represented by a matrix M2(A'&B).

The signal processing unit then performs a range-FFT on each row of M2(A&B'), resulting in range and velocity data 450 shown in matrix M3(A&B'). Shaded cell 455 represents a range and velocity of an object, the object indicated in shaded row 435 in matrix M2(A) and M2(A&B'). Each row of M3(A&B') corresponds to a relative velocity with respect to the radar system and each column corresponds to a range bin representing a range of distances between an object and the radar system. M3(A&B') includes the same information in matrix M3 shown in FIG. 3, and can be used for additional signal processing just as M3 is used, without modification to the subsequent signal processing.

Figure 5:
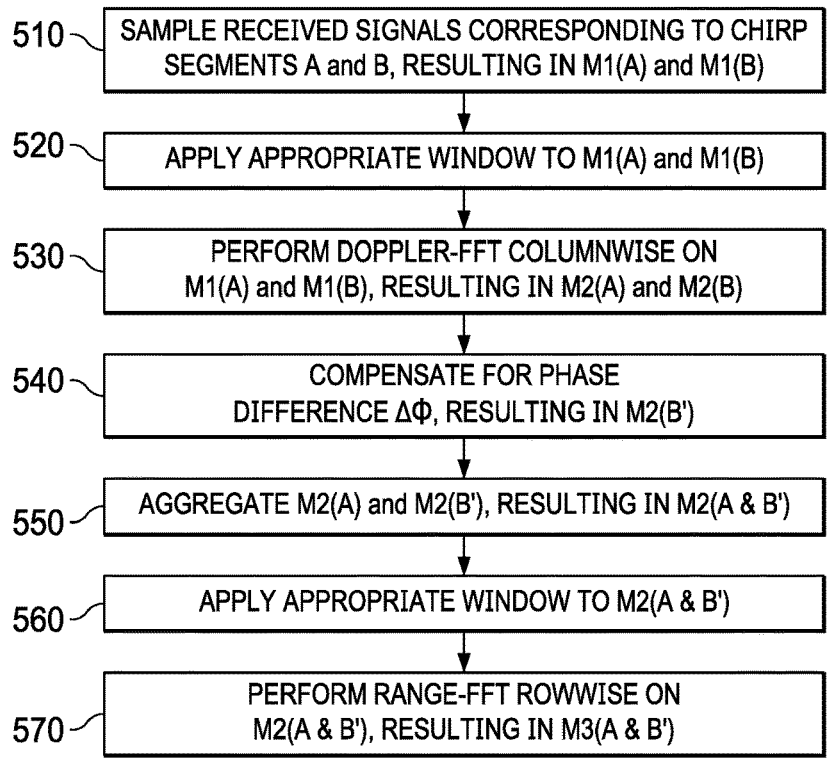
FIG. 5 illustrates, in flow chart form, an example method for processing received signals corresponding to segmented chirp signals.

FIG. 5 shows a flow chart illustrating the example data processing flow for segmented chirp signals shown in FIG. 4. The process shown in FIG. 5 is performed by a processing unit executing instructions stored in a non-transitory computer-readable medium, such as signal processing unit 132 executing instructions stored in storage 150 from radar system 100 shown in FIG. 1. At step 510, received signals corresponding to chirp segments A and B are sampled, resulting in a matrix M1(A) and a matrix M1(B). At step 520, an appropriate window may be applied to each column of M1(A) and M1(B), such as a Hanning window. At step 530, a Doppler-FFT is performed column-wise on M1(A) and M1(B) resulting in a matrix M2(A) and a matrix M2(B). At step 540, the phase difference Δφ is compensated for, resulting in matrix M2(B'). At step 550, M2(A) and M2(B') are aggregated, resulting in matrix M2(A&B'). At optional step 560, an appropriate window is applied to each row of M2(A&B'), such as a Hanning window. At step 570, a range-FFT is performed row-wise on M2(A&B'), resulting in matrix M3(A&B').

Figure 6:
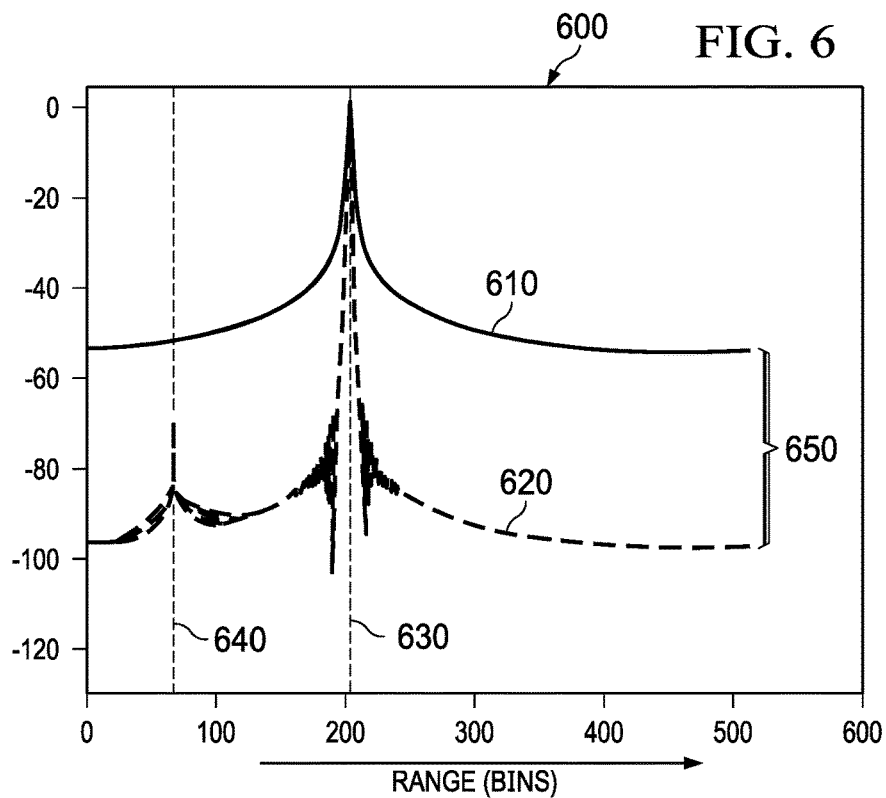
FIG. 6 shows a graph illustrating a leakage reduction associated with the example data processing flow shown in FIG. 4.

FIG. 6 shows a graph illustrating a leakage reduction associated with the example data processing flow shown in FIG. 4. Graph 600 illustrates a range slice for a particular velocity, e.g. a row of phase corrected matrix M3(A&B') and a row of uncorrected matrix M3(A&B) corresponding to the particular velocity. Signal 610 corresponds to the row of uncorrected matrix M3(A&B) and signal 620 corresponds to the row of phase corrected matrix M3(A&B'). The peaks in signals 610 and 620 at 630 correspond to an object at that range bin with the particular velocity. The phase difference Δϕ causes leakage of peak received signals, corresponding to larger and closer objects, which can suppress received signals corresponding to smaller or more distant objects and decrease the sensitivity of a radar system. As illustrated in graph 600, signal 610 shows a large amount of leakage and suppresses the weaker peak in signal 620 at 640, corresponding to a smaller object at that range bin with the particular velocity. Signal 620 with phase correction has a leakage reduction 650 compared to signal 610 without phase correction, and allows the radar system to recognize the object at 640.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors. The embodiments are described herein with reference to FTs and FFTs, but may be generalized to other types of time domain to frequency domain transforms such as sine and cosine transforms, and the like.

Modifications are possible in the described embodiments, and other embodiments are possible, within the scope of the claims.

What is claimed is:

1. A non-transitory computer-readable storage device storing machine instructions which, when executed by one or more processor cores, cause the one or more processor cores to:
   obtain received signals corresponding to a number Nc of transmitted chirps from a radar sensor circuit, wherein each of the Nc transmitted chirps comprises an A chirp segment having a first bandwidth spanning a first frequency range and a B chirp segment having a second bandwidth spanning a second frequency range that is different than the first frequency range, in which each B chirp segment is time-spaced from the corresponding A chirp segment by a time gap (Tgap), and in which each chirp has a total continuous bandwidth of the first bandwidth plus the second bandwidth;
   sample the received signals to obtain a first set of sampled data arrays corresponding to the A chirp segments and a second set of sampled data arrays corresponding to the B chirp segments, each sampled data array of the first set of sampled data arrays including a respective sample of each of the A chirp segments and each sampled data array of the second set of sampled data arrays including a respective sample of each of the B chirp segments;
   perform a first transform operation on each sampled data array of the first set of sampled data arrays to obtain a first set of velocity data arrays and on each sampled data array of the second set of sampled data arrays to obtain a second set of velocity data arrays;
   apply a phase compensation factor (ϕcorrection) to the second set of velocity data arrays to obtain a set of phase corrected second velocity data arrays;
   concatenate the first set of velocity data arrays and the set of phase corrected second velocity data arrays to obtain a set of aggregate velocity data arrays; and
   perform second transform operations on the set of aggregate velocity data arrays to obtain a set of range and velocity data.

2. The storage device of claim 1, wherein the machine instructions to apply the ϕcorrection to the second set of velocity data arrays cause the one or more processor cores to:
   determine a ϕcorrection(m) for each velocity bin m across the second set of velocity data arrays; and
   multiply velocity data in each velocity bin m by the ϕcorrection(m).

3. The storage device of claim 2, wherein each of the Nc transmitted chirps has a period Tchirp, wherein the A chirp segment is transmitted before the Tgap, wherein the B chirp segment is transmitted after the Tgap, and wherein the machine instructions cause the one or more processor cores to determine the ϕcorrection(m) using the equation:

$$\phi\text{correction}(m) = e^{j2\pi m'K}$$

where m' is proportional to a velocity represented by velocity bin m of the second set of velocity data arrays and represented as:

$$m' = \begin{cases} m; & \text{if } 0 \leq m \leq \dfrac{Nc}{2} \\ m - Nc; & \text{if } \dfrac{Nc}{2} < m < Nc \end{cases},$$

and where K is a proportional to the Tgap and represented as:

$$K = \dfrac{Tgap}{Nc(Tchirp)}.$$

4. The storage device of claim 2, wherein each of the Nc transmitted chirps has a period Tchirp, wherein the B chirp segment is transmitted before the Tgap, wherein the A chirp segment is transmitted after the Tgap, and wherein the machine instructions cause the one or more processor cores to determine the ϕcorrection(m) using the equation:

$$\phi\text{correction}(m) = e^{-j2\pi m'K}$$

where m' is proportional to a velocity represented by velocity bin m of the second set of velocity data arrays and represented as:

$$m' = \begin{cases} m; & \text{if } 0 \leq m \leq \dfrac{Nc}{2} \\ m - Nc; & \text{if } \dfrac{Nc}{2} < m < Nc \end{cases},$$

and K is proportional to the Tgap and represented as:

$$K = \dfrac{Tgap}{Nc(Tchirp)}.$$

5. The storage device of claim 1, further comprising machine instructions which, when executed by the one or more processor cores, cause the one or more processor cores to apply a window function to the first set of sampled data arrays and to the second set of sampled data arrays to generate a first set of windowed sampled data arrays and a second set of windowed sampled data arrays, wherein the first transform operation is performed on each windowed sampled data array of the first and second sets of windowed sampled data arrays.

6. The storage device of claim 5, wherein the window function comprises a Hanning window function.

7. The storage device of claim 1, further comprising machine instructions which, when executed by the one or more processor cores, cause the one or more processor cores to apply a window function to the set of aggregate velocity data arrays to generate a set of windowed aggregate velocity data arrays, wherein the second transform operations are performed on the set of windowed aggregate velocity data arrays.

8. The storage device of claim 7, wherein the window function comprises a Hanning window function.

9. An apparatus, comprising:
one or more processor cores; and
one or more non-transitory computer-readable mediums storing machine instructions which, when executed by the one or more processor cores, cause the one or more processor cores to:
obtain received signals corresponding to a number Nc of transmitted chirps from a radar sensor circuit, wherein each of the Nc transmitted chirps comprises an A chirp segment having a first bandwidth spanning a first frequency range and a B chirp segment having a second bandwidth spanning a second frequency range that is different than the first frequency range, in which each B chirp segment is time-spaced from the corresponding A chirp segment by a time gap (Tgap), and in which each chirp has a total continuous bandwidth of the first bandwidth plus the second bandwidth;
sample the received signals to obtain a first set of sampled data arrays corresponding to the A chirp segments and a second set of sampled data arrays corresponding to the B chirp segments, each sampled data array of the first set of sampled data arrays including a respective sample of each of the A chirp segments and each sampled data array of the second set of sampled data arrays including a respective sample of each of the B chirp segments;
perform a first transform operation on each sampled data array of the first set of sampled data arrays to obtain a first set of velocity data arrays and on each sampled data array of the second set of sampled data arrays to obtain a second set of velocity data arrays;
apply a phase compensation factor (ϕcorrection) to the second set of velocity data arrays to obtain a set of phase corrected second velocity data arrays;
concatenate the first set of velocity data arrays and the set of phase corrected second velocity data arrays to obtain a set of aggregate velocity data arrays; and
perform second transform operations on the set of aggregate velocity data arrays to obtain a set of range and velocity data.

10. The apparatus of claim 9, wherein the machine instructions to apply the ϕcorrection to the second set of velocity data arrays cause the one or more processor cores to:
determine a ϕcorrection(m) for each velocity bin m of across the second set of velocity data arrays; and
multiply velocity data in each velocity bin m by the ϕcorrection(m).

11. The apparatus of claim 10, wherein each of the Nc transmitted chirps has a period Tchirp, wherein the A chirp segment is transmitted before the Tgap, wherein the B chirp segment is transmitted after the Tgap, and wherein the machine instructions cause the one or more processor cores to determine the ϕcorrection(m) using the equation:

$$\phi\text{correction}(m) = e^{j2\pi m' K}$$

where m' is proportional to a velocity represented by velocity bin m of the second set of velocity data arrays and represented as:

$$m' = \begin{cases} m; & \text{if } 0 \le m \le \dfrac{Nc}{2} \\ m - Nc; & \text{if } \dfrac{Nc}{2} < m < Nc \end{cases}$$

and where K is proportional to the Tgap and represented as:

$$K = \dfrac{Tgap}{Nc(Tchirp)}.$$

12. The apparatus of claim 10, wherein each of the Nc transmitted chirps has a period Tchirp, wherein the B chirp segment is transmitted before the Tgap, wherein the A chirp segment is transmitted after the Tgap, and wherein the machine instructions cause the one or more processor cores to determine the ϕcorrection(m) using the equation:

$$\phi\text{correction}(m) = e^{-j2\pi m' K}$$

where m' is proportional to a velocity represented by velocity bin m of the second set of velocity data arrays and represented as:

$$m' = \begin{cases} m; & \text{if } 0 \le m \le \dfrac{Nc}{2} \\ m - Nc; & \text{if } \dfrac{Nc}{2} < m < Nc \end{cases}$$

and where K is proportional to the Tgap and represented as:

$$K = \dfrac{Tgap}{Nc(Tchirp)}.$$

13. The apparatus of claim 9, further comprising machine instructions which, when executed by the one or more processor cores, cause the one or more processor cores to apply a window function to the first of sampled data arrays and to the second set of sampled data arrays to generate a first set of windowed sampled data arrays and a second set of windowed sampled data arrays, wherein the first transform operation is performed on each of the windowed sampled data arrays of the first and second sets of windowed sampled data arrays.

14. The apparatus of claim 13, wherein the window function comprises a Hanning window function.

15. The apparatus of claim 9, further comprising machine instructions which, when executed by the one or more processor cores, cause the one or more processor cores to apply a window function to the set of aggregate velocity data arrays to generate a set of windowed aggregate velocity data arrays, wherein the second transform operations are performed on the set of windowed aggregate velocity data arrays.

16. The apparatus of claim 15, wherein the window function comprises a Hanning window function.

17. The apparatus of claim 9, further comprising the radar sensor circuit, wherein the machine instructions to obtain the received signals cause the one or more processor cores to:
- cause the radar sensor circuit to transmit the Nc transmitted chirps; and
- cause the radar sensor circuit to generate the received signals corresponding to the Nc transmitted chirps.

18. The apparatus of claim 17, wherein the radar sensor circuit comprises:
- an oscillator system configured to generate the Nc transmitted chirps;
- a transmitter antenna unit coupled to the oscillator system and configured to transmit the Nc transmitted chirps;
- a receiver antenna unit configured to receive reflections of the Nc transmitted chirps;
- a baseband module coupled to the receiver antenna unit and configured to generate the received signals based on the received reflections of the Nc transmitted chirps; and
- an analog to digital converter coupled to the baseband module and configured to sample the received signals to obtain the first and second sets of sampled data arrays.

19. The apparatus of claim 18, wherein the oscillator system comprises:
- a first voltage controlled oscillator configured to generate the A chirp segments; and
- a second voltage controlled oscillator configured to generate the B chirp segments.

20. A method for processing data from a radar system transmitting chirp signals, comprising:
- obtaining a first set of received signals corresponding to an A type of transmitted chirp segments, each of which has a first bandwidth spanning a first frequency range;
- obtaining a second set of received signals corresponding to a B type of transmitted chirp segments, each of which has a second bandwidth spanning a second frequency range that is different than the first frequency range, wherein each of the transmitted chirp signals includes a respective one of the A type of transmitted chirp segments and a respective one of the B type of transmitted chirp segments, and wherein each of the transmitted chirp signals has a total continuous bandwidth of the first bandwidth plus the second bandwidth;
- sampling the first set of received signal to obtain a first set of sampled data and the second set of received signals to obtain a second set of sampled data;
- performing a first Fourier transform operation on each sampled data array of the first set of sampled data arrays to obtain a first set of velocity data arrays and on each sampled data array of the second set of sampled data arrays to obtain a second set of velocity data arrays;
- applying a phase compensation factor (ϕcorrection) to the second set of velocity data arrays to obtain a set of phase corrected second velocity data arrays;
- concatenating the first set of velocity data arrays and the set of phase corrected second velocity data arrays to obtain a set of aggregate velocity data arrays; and
- performing second transform operations on the set of aggregate velocity data arrays to obtain a set of range and velocity data.

21. The method of claim 20, wherein applying the ϕcorrection to the second set of velocity data arrays comprises:
- determining a ϕcorrection(m) for each velocity bin m across the second set of velocity data arrays; and
- multiplying velocity data in velocity bin m by the ϕcorrection(m).

22. The method of claim 21, wherein each A type of transmitted chirp segment is transmitted before a corresponding one of the B type of transmitted chirp, which together form a transmitted chirp signal that are time-spaced by a time gap (Tgap), wherein the ϕcorrection(m) is determined using the equation:

$$\phi\text{correction}(m) = e^{j2\pi m'K}$$

where m' is proportional to a velocity represented by velocity bin m of the second set of velocity data arrays and represented as:

$$m' = \begin{cases} m; & \text{if } 0 \le m \le \dfrac{Nc}{2} \\ m - Nc; & \text{if } \dfrac{Nc}{2} < m < Nc \end{cases}$$

where Nc represents a number of transmitted chirp signals, and where K is proportional to the Tgap and represented as:

$$K = \dfrac{Tgap}{Nc(Tchirp)}$$

where Tchirp represents a period of a transmitted chirp signal.

23. The method of claim 21, wherein each B type of transmitted chirp segment is transmitted before a corresponding one of the A type of transmitted chirp, which together form a transmitted chirp signal that are time-spaced by time gap (Tgap), wherein the ϕcorrection(m) is determined using the equation:

$$\phi\text{correction}(m) = e^{-j2\pi m'K}$$

where m' is proportional to a velocity represented by velocity bin m of the second set of velocity data arrays and represented as:

$$m' = \begin{cases} m; & \text{if } 0 \le m \le \dfrac{Nc}{2} \\ m - Nc; & \text{if } \dfrac{Nc}{2} < m < Nc \end{cases}$$

where Nc represents a number of transmitted chirp signals, and where K is proportional to the Tgap and represented as:

$$K = \dfrac{Tgap}{Nc(Tchirp)}$$

where Tchirp represents a period of a transmitted chirp signal.

* * * * *